US00RE35226E

United States Patent [19]

Howard

[11] E Patent Number: Re. 35,226

[45] Reissued Date of Patent: May 7, 1996

[54] GAMING MACHINE REEL SUPPORT STRUCTURE

[75] Inventor: Terence Howard, Nottingham, England

[73] Assignee: Bell-Fruit Manufacturing Company Limited, Nottingham, England

[21] Appl. No.: 328,870

[22] Filed: Oct. 25, 1994

Related U.S. Patent Documents

Reissue of:

[64] Patent No.: 5,284,344
Issued: Feb. 8, 1994
Appl. No.: 834,115
Filed: Feb. 11, 1992

[30] Foreign Application Priority Data

Aug. 12, 1989 [GB] United Kingdom ..... 8918448

[51] Int. Cl.[6] ..... G07F 17/34

[52] U.S. Cl. ..... 273/143 R

[58] Field of Search ..... 273/143 R

[56] References Cited

U.S. PATENT DOCUMENTS

| | | | |
|---|---|---|---|
| 2,035,084 | 3/1936 | May | 273/143 R |
| 2,545,644 | 3/1951 | Benton et al. | 273/143 R |
| 4,249,737 | 2/1981 | Hancherick | 273/143 R |
| 4,262,906 | 4/1981 | Heywood | 273/143 R |
| 4,534,560 | 8/1985 | Okada | 273/143 R |
| 4,621,815 | 11/1986 | Yamamoto | 273/143 R |
| 4,711,452 | 12/1987 | Dickinson et al. | 273/143 R |
| 4,765,078 | 8/1988 | Yamamoto | 40/309 |
| 4,773,648 | 9/1988 | Itoh | 273/143 R |
| 4,874,172 | 10/1989 | Nakamura | 273/143 R |
| 4,912,389 | 3/1990 | Eguchi | 273/143 R |

FOREIGN PATENT DOCUMENTS

| | | | |
|---|---|---|---|
| 0142370 | 5/1985 | European Pat. Off. . | |
| 0317123 | 5/1989 | European Pat. Off. . | |
| 2921159 | 4/1980 | Germany . | |
| 0021278 | 1/1991 | Japan | 273/142 R |
| 412289 | 6/1934 | United Kingdom | 40/472 |
| 1233081 | 5/1971 | United Kingdom | 273/143 R |
| 1488658 | 10/1977 | United Kingdom | 273/143 R |
| 2092795A | 8/1982 | United Kingdom . | |
| 2137514 | 10/1984 | United Kingdom | 273/143 E |
| 2165387A | 4/1986 | United Kingdom . | |
| 2165074A | 4/1986 | United Kingdom | 273/143 R |
| 2183883A | 6/1987 | United Kingdom . | |
| 2183883 | 6/1987 | United Kingdom | 273/143 R |

*Primary Examiner*—Benjamin H. Layno
*Attorney, Agent, or Firm*—Christensen O'Connor Johnson & Kindness

[57] ABSTRACT

A reel for a gaming or amusement machine has a support structure for supporting the reel strip of a significantly lower moment of inertia than a standard reel drum. This is achieved by making the reel strip of stiff material and supporting it only at spaced-apart points, and relying on the strip to support itself between the supported points. The reel support for the strip may be in the form of one or two spiders, each having a plurality of radial spokes. For further support for the strip a ring member may be provided connecting the ends of the spokes. If two such spiders are used, the ring members may be interconnected.

6 Claims, 8 Drawing Sheets

FIG.9.c.

GAMING MACHINE REEL SUPPORT STRUCTURE

Matter enclosed in heavy brackets [ ] appears in the original patent but forms no part of this reissue specification; matter printed in italics indicates the additions made by reissue.

*This application is a continuation of prior copending international PCT Application No. PCT/GB/01258, filed on Aug. 10, 1990, the beneift of the filing date which is hereby claimed under 35 U.S.C. § 120.*

This invention relates to gaming and amusement machines and in particular to those commonly known as fruit machines. In such machines a number of reels, usually three or four carrying symbols on their peripheries are spun and then stopped at random. If they come to a halt with any one of a number of selected combinations of symbols on a so-called 'win line', an award is made or other equivalent benefit is obtained. Such a machine will hereinafter be referred to as the kind set forth.

Traditionally these reels have been mechanical, rotating side by side on a common axis and with the symbols carried on their peripheral cylindrical surfaces. This is almost universal although in certain countries, e.g. Germany, the reels are sometimes in the form of flat discs with the symbols arranged in a ring on one face. Even an arrangement involving each reel being in the form of a frustum of a cone, with the peripheries lying in a common conical surface, is known.

Attempts have been made to get away from the simple printed representation of the symbols, usually fruit such as plums, cherries, oranges and so on, and it has been proposed to project the symbols optically in turn onto a flat translucent screen, the so-called Panascope system. We have ourselves proposed to use a video screen on which an electrically generated image of the rotating reels is displayed. However these alternatives lack the contrast and brightness of a colour-printed two-dimensional picture of the symbol and so there has lately been a reversion to the mechanical reels with the symbols on their peripheries.

It has been proposed, in GB 2 183 883 A, to provide gaming and amusement machines with symbols formed in relief, i.e. in three-dimensions, on the periphery of the reel so that they stand out from the surface of the reel.

The general outline of the use of such symbols in relief is described in GB 2 183 833 A, and the functional advantages of the such use is intimated. The ability, for example, to recognise the symbols rapidly is enhanced, which improves the user's perception of the game, and the recognition in particular of symbols further round the periphery of the reel (away from the winline) allows the machine to be constructed so that certain game sub-features (such as nudging, for example) are possible under conditions in which, with conventional flat-printed reel strip symbols, they would not otherwise be practicable.

Suggested methods of forming symbols in relief, which conventionally would be fruit symbols but could be in other forms as required by the game, have, up to now, been based upon the symbol concerned being raised from the surface of a flat reel-strip base material, such that the material forming the reel-strip at any point on the embossed or raised area is situated at a greater radius than that of the base material. There is a severe disadvantage of this apaproach which has become apparent in practice, however, in that the base material must conform to the surface of the reel drum in order to be mounted accurately to it: the reel drum, being a rotated component, needs to be symmetrical (i.e. cylindrical), and hence the surface onto which the reel-strip base material is fitted is also cylindrical.

In current art, it is known that the reel drum does not need to be a complete surface, and that large parts of its area can be beneficially removed to conserve weight (and hence reduce inertia) and material content; however, the reel-strip material itself still has to conform to the cylindrical outline of that part of the reel drum remaining, particularly along the outside rim of the drum which is the main reel-strip supporting element. The disadvantage of the relief or embossing method as described above is that the reel-strip material deforms under the process for forming the symbols in relief, and when wrapped around the drum tends to form a series of inaccurate straight edges at parts of the strip containing the symbols in relief, and curves of sharper than required radius at points where there are no such symbols in relief. The amount to which such distortion occurs is not easily predictable and depends to a certain extent on the shape of the particular symbol. This inaccuracy makes the reel-strip difficult to fit, and also the lack of precise control in the exact shape of the edges of the reel-strip make the risk of fouling on the reel drum-supporting components likely.

Also, conventional reel drums are usually rotated by an electrically driven motor, for instance a stepper motor, and in order to lessen the dynamic load on the motor driving the rotating parts of the reel assembly, it is usual to remove any unnecessary material from the drum, whilst still retaining a rim to provide circumferential attachment for the reel-strip; the conventional reel-strip not being of any significant structural strength.

In our co-pending patent application filed at the same time as this Application we disclose a reel strip having three-dimensional embossed symbols, which is not distorted by the embossing process. Such a reel strip may therefore be formed into an accurately shaped reel.

According to a first aspect the invention consists in a reel for a gaming or amusement machine having a reel strip extending circumferentially around a support structure which supports the reel strip at spaced-apart locations, the reel strip being self-supporting between locations at which it is supported, characterised in that the reel strip is sufficiently rigid as to contribute to a significant degree to the structural strength of the reel as a whole, the reel (comprising the reel strip connected to the support structure) being substantially stronger than the support structure alone.

Thus the strip can be supported at circumferentially or transversely spaced locations and remain unsupported in between the support positions. Providing the strip of stiff plastics material assists in this.

According to a second aspect of the invention consists support structure for a reel strip of a gaming or amusement machine, the support structure being adapted to support the reel-strip at spaced apart locations so as to enable a reel in accordance with the first aspect of the invention to be provided.

According to a third aspect of the invention comprises a gaming or amusement machine having a reel in accordance with the first aspect of the invention.

We provide a support for a reel-strip, to take the place of a conventional reel drum, and thereby provides a reel of substantially lower weight than a conventional reel. Such a support may advantageously be used with the reel strip described above, but may also be used with any other type of reel strip which works satisfactory.

Embodiments of the present invention will now be described, by way of example only, with reference to the accompanying drawings in which.

Figure 2:
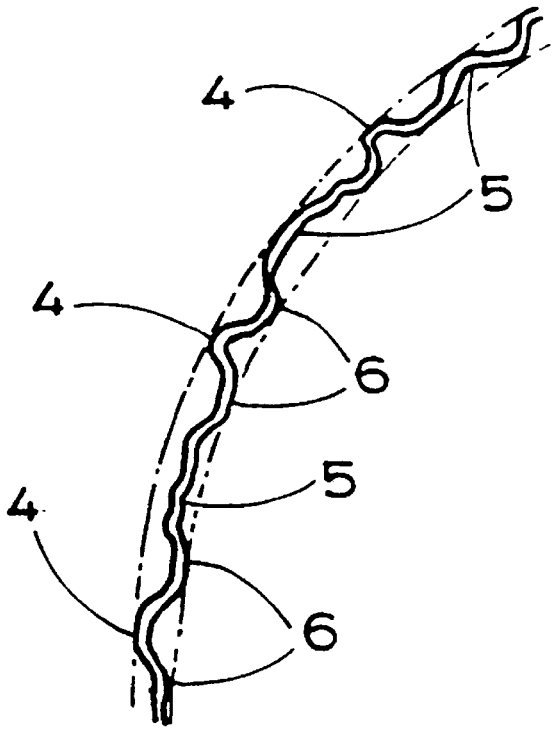
FIG. 2 is a side sectional view of a curved reel-strip suitable for use with the invention.
Figure 3:
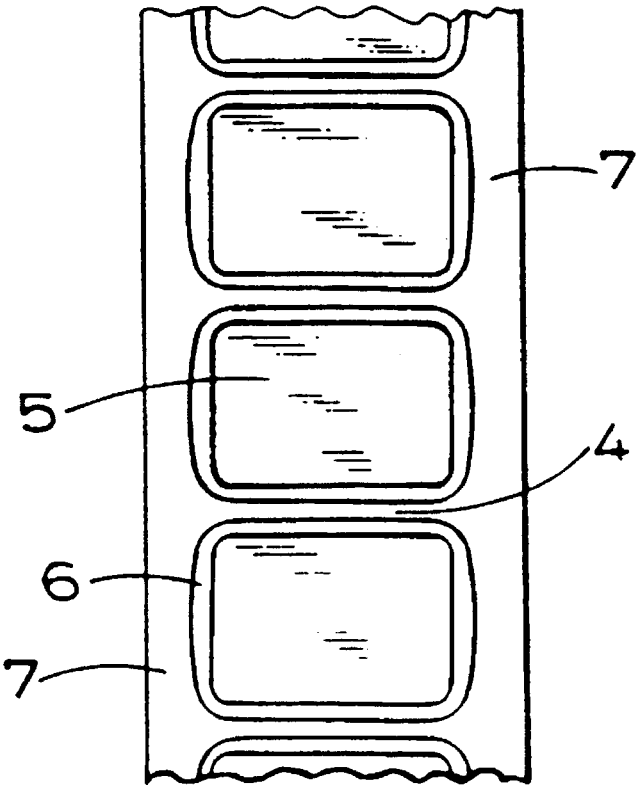
FIG. 3 is a front view of the reel-strip of FIG. 2.
Figure 4:
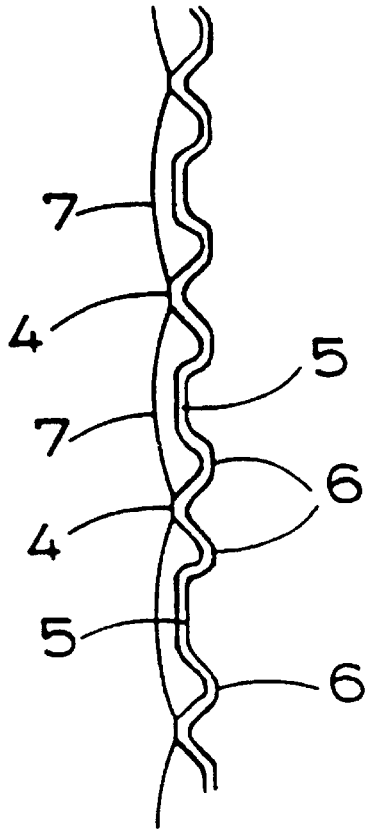
FIG. 4 is a side sectional view of the strip of FIGS. 2 and 3 in flat form.
Figure 7:
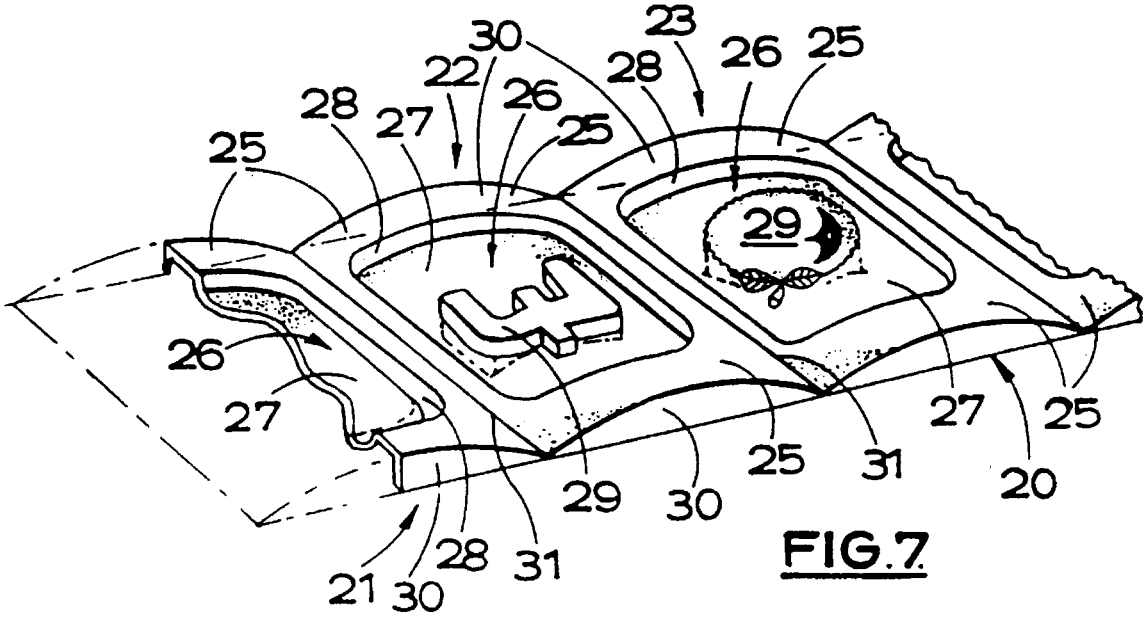
FIG. 7 shows another reel-strip suitable for use within the first aspect of the invention in a flat configuration.
Figure 8:
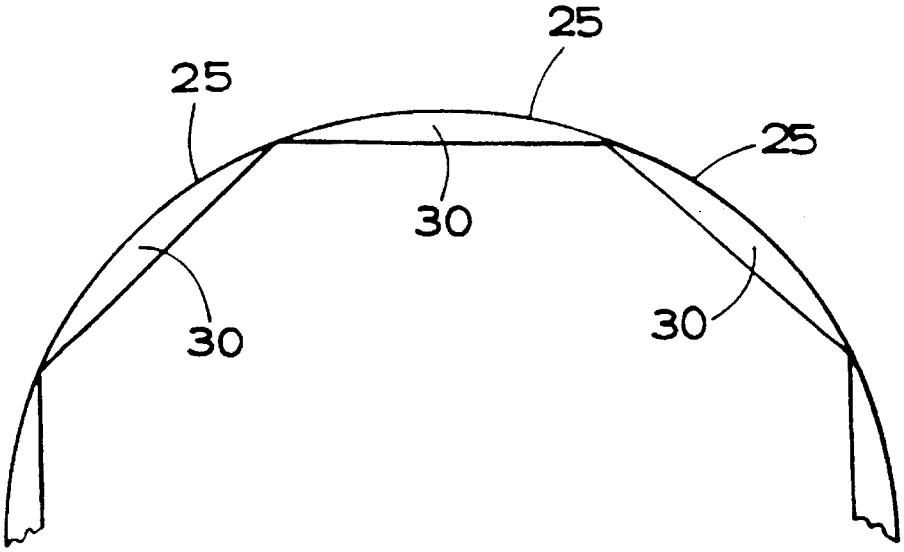
FIG. 8 shows the reel-strip of FIG. 7 in its configuration of use.
Figure 9A:
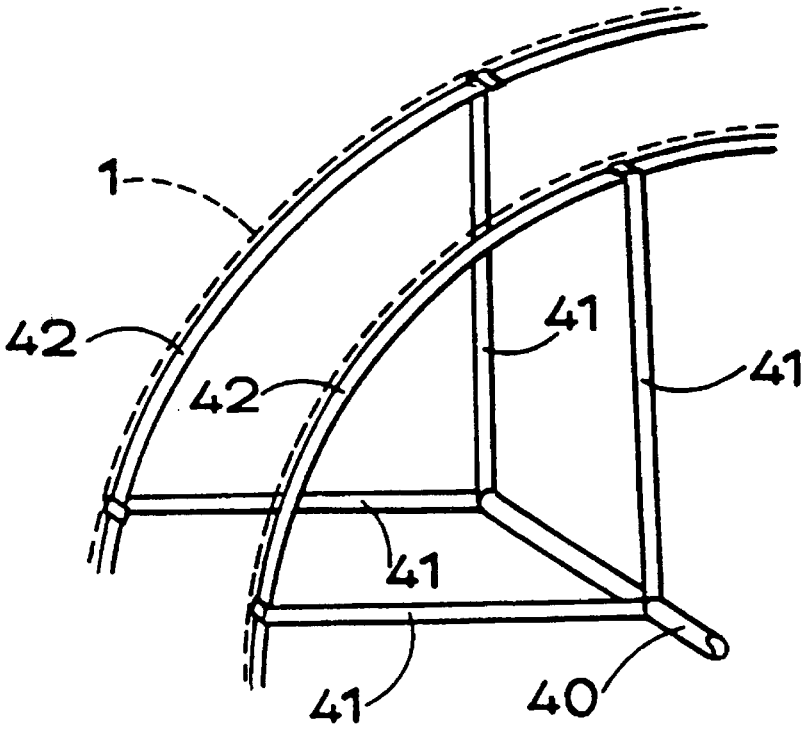
Figure 9B:
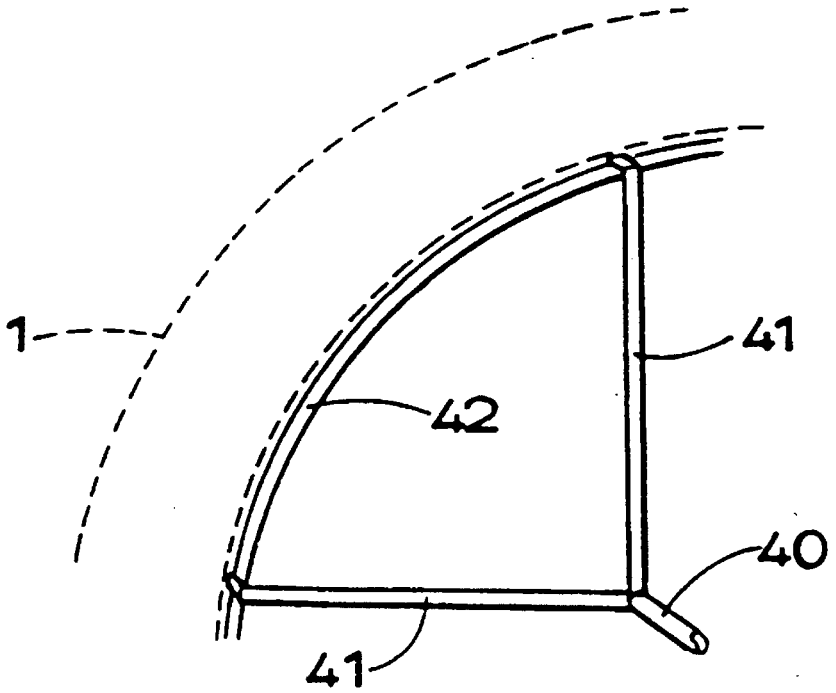
Figure 10:
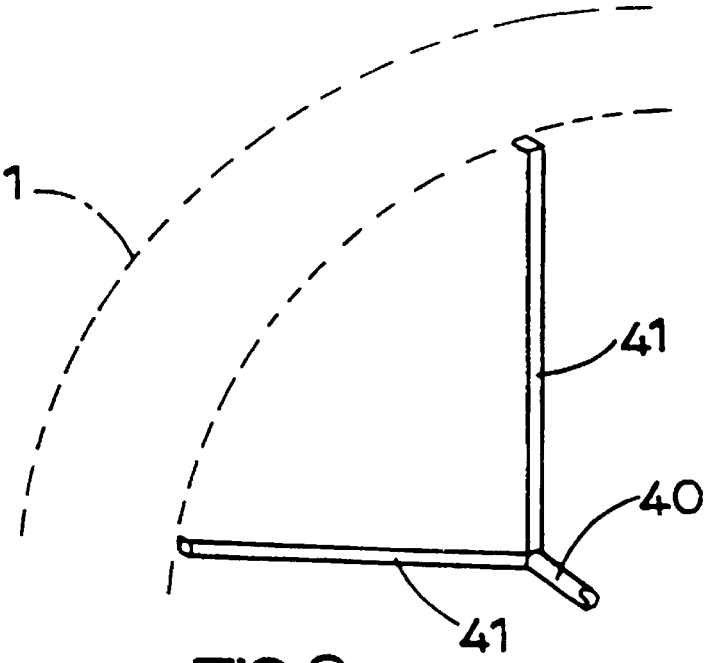
Figure 10:
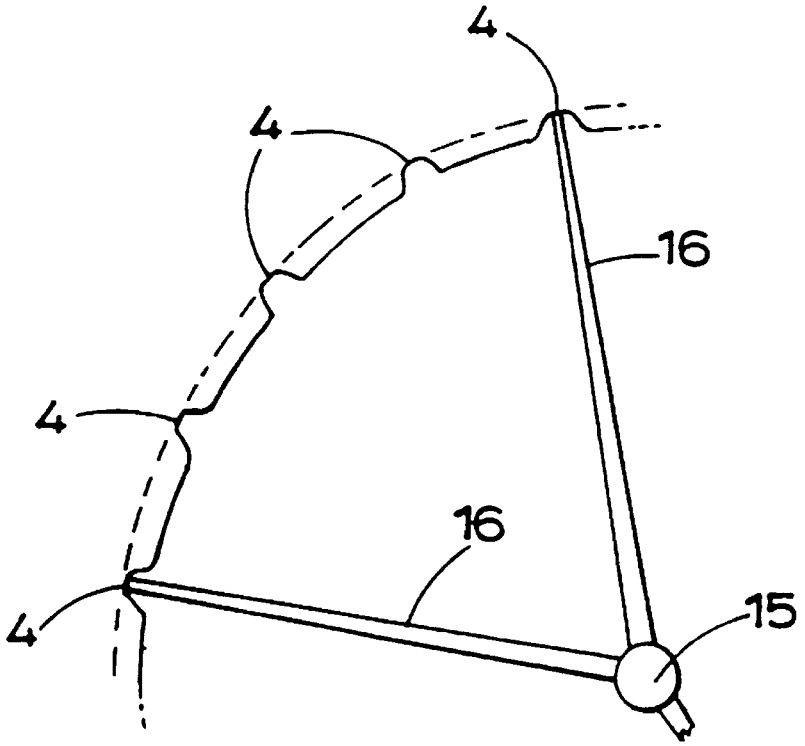
Figure 11:
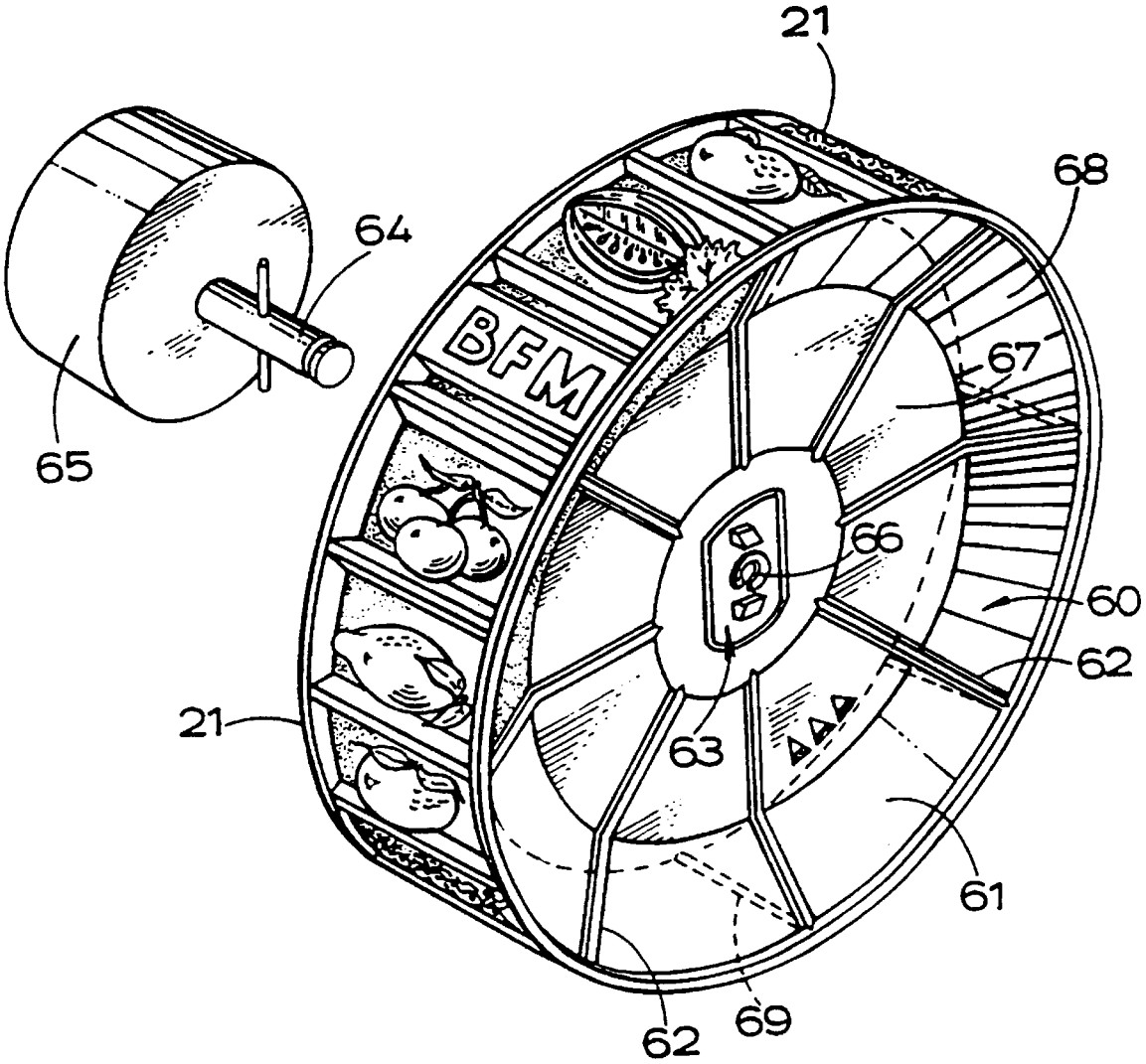
Figure 12:
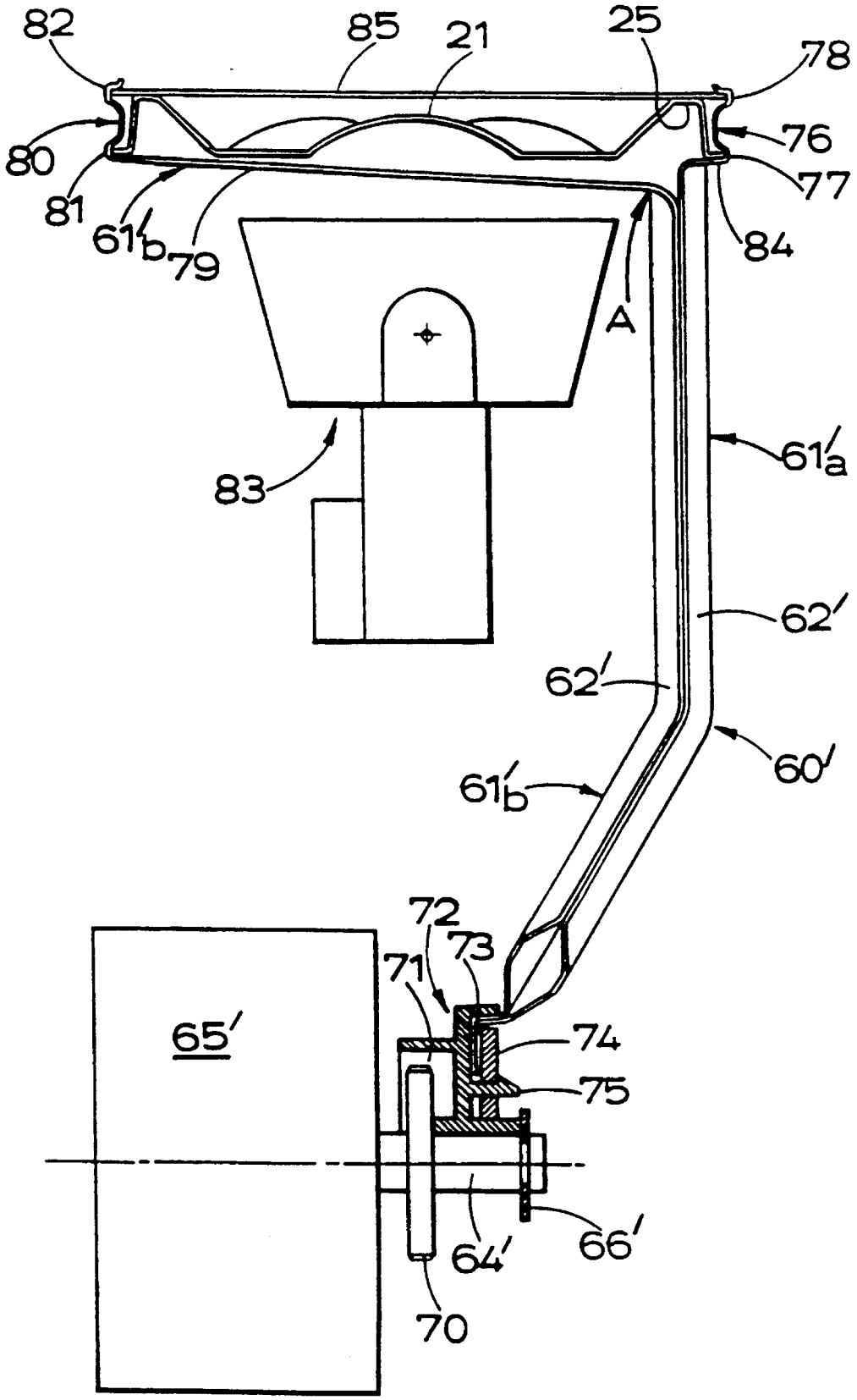

FIGS. 9a, 9b, and 9c are perspective views of three alternative arrangements of a support mechanism for a reel-strip;

FIG. 10 is a side sectional view of a rotary support structure according to a second aspect of the present invention for the reel-strip of FIGS. 2 to 4, or that of FIGS. 7 and 8;

FIG. 11 is an exploded view of a reel assembly in accordance with the first aspect of the invention;

FIG. 12 is a sectional view of another reel assembly; and

Figure 13:
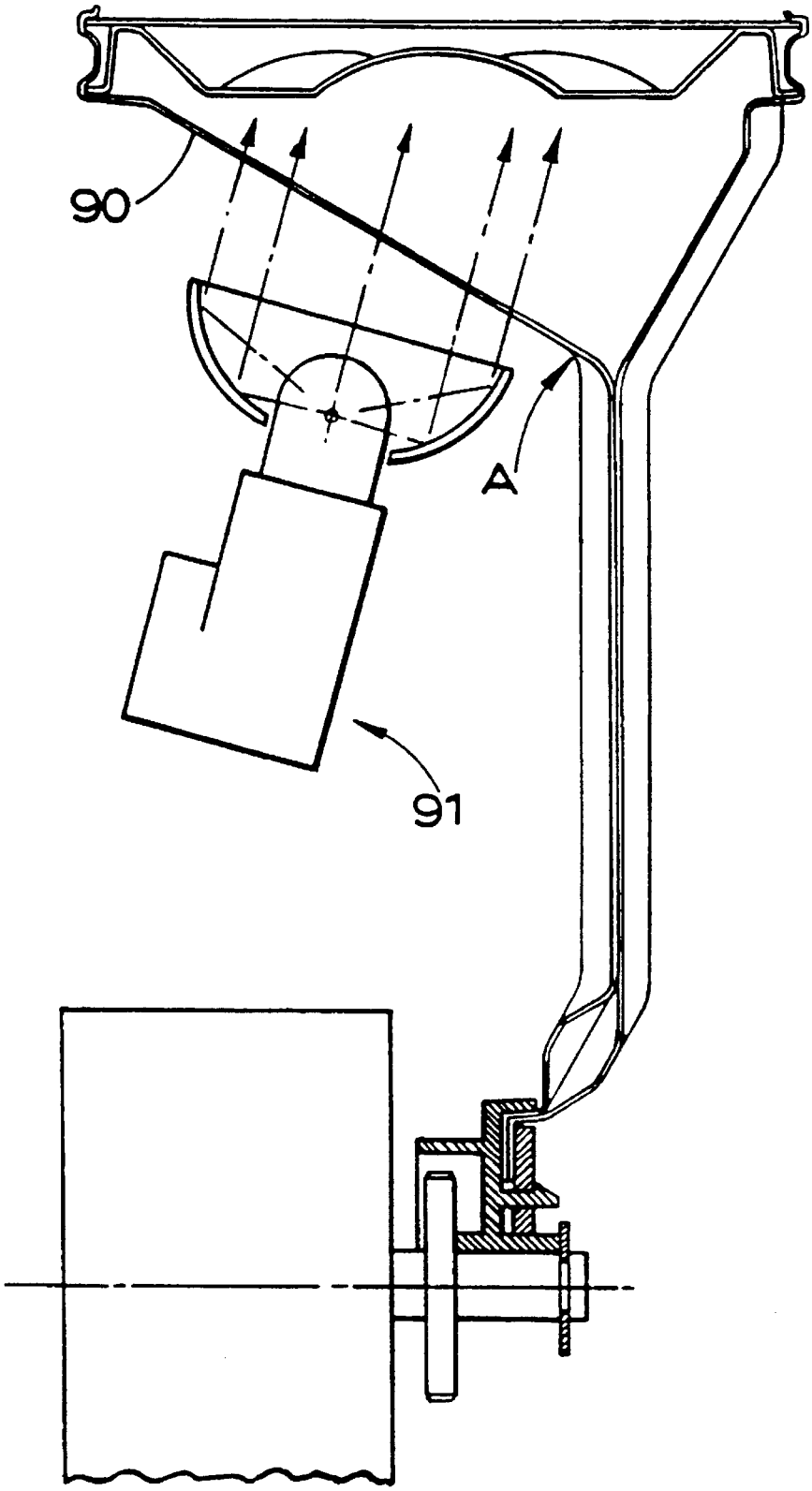

FIG. 13 shows a modification of the reel assembly of FIG. 12.

Figure 1:
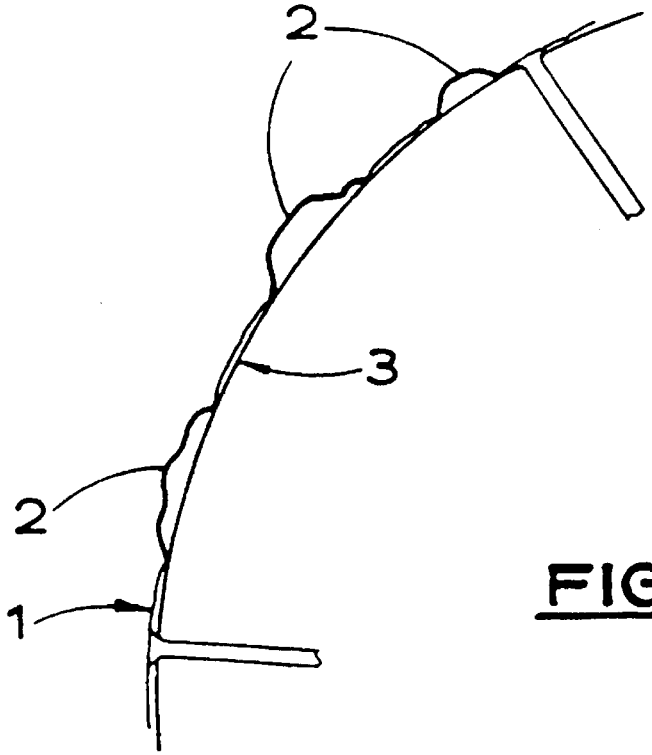
FIG.1. PRIOR ART
FIG. 1 is a sketch view showing in profile a known type of reel-strip attached to a reel drum of a fruit machine.

FIG. 1 shows a known type of reel-strip 1 having embossed symbols 2 formed in relief which stand out from the surface of the strip. The strip 1 is attached to the outer periphery of a conventional reel drum 3. The strip with embossed symbols 2 of this form, however, suffers from the disadvantage that the reel-strip material deforms under the embossing process and consequently the reel-strip does not fit very well onto the reel drum 3 and there is a risk of fouling during rotation.

The reel-strip shown in FIGS. 2 to 4 may be formed from thin plastics sheet material and has raised sections 4 and a plurality of symbols 5 formed in relief surrounded by sunken surrounding regions 6. As shown in FIG. 4 the reel-strip may initially be made in flat form before it takes up its curved position in use as part of a fruit machine reel. In its flat form, the borders 7 of the reel-strip may bulge slightly above the raised sections 4 but in its curved form (FIG. 2) they will normally have the same radius from the centre of the reel as the raised sections 4 between the symbols 5 and their surrounding sunken regions 6.

In an alternative arrangement, the borders 7 of the reel strip may be formed such that they are flat when the reel strip is curved around a drum reel. In this case, bends, or lines of weakness are formed at the bounderies between adjacent symbol frames 5 to ensure that the reel is very nearly polygonal and does not bulge outwards near the centre of a frame.

It will be appreciated that the symbols 5 have a maximum height above their surrounding regions 6 such that when the strip forms at least part of a reel assembly, the radius of the outermost surface of the fruit symbols 5 does not exceed the rotational radius of the front of the reel constituted by the raised sections 4 and the borders 7 of the strip.

Another embodiment of the first aspect of the invention is shown in FIGS. 7 and 8. FIG 7 shows a moulded plastics reel-strip 20 having adjacent segments 21,22,23 and 24 in a flat configuration. The strip 20 is a vacuum moulded thin plastics component, each segment comprises a part-cylindrical frame surface 25, a recess 26, a base surface 27 or the recess, side surfaces 28 of the recess, a relief symbol 29 standing proud of the base surface 27, and two opposed spaced side walls 30. A line of flexing, or weakness 31 is provided between the adjacent frame surfaces 25 or adjacent segments.

The symbols 29 project above the respective base surfaces 27 to an extent which is not more than the depth of the recess, thus staying at or below the level of the respective frame surfaces 25. The symbols 29 may have a substantially flat upper surface, such as the pound symbol of segment 22, or a dimpled or profiled surface such as the orange of segment 23. A number may be moulded with the symbol (see segment 24).

The side walls 30 are segments of a circle and when the strip 20 is in use (see FIG. 8) the frame surfaces 25 lie in a common cylinder, with the side walls 25 being segments of a first or a second circle (depending upon which side of the segments the walls are provided).

Figure 5:
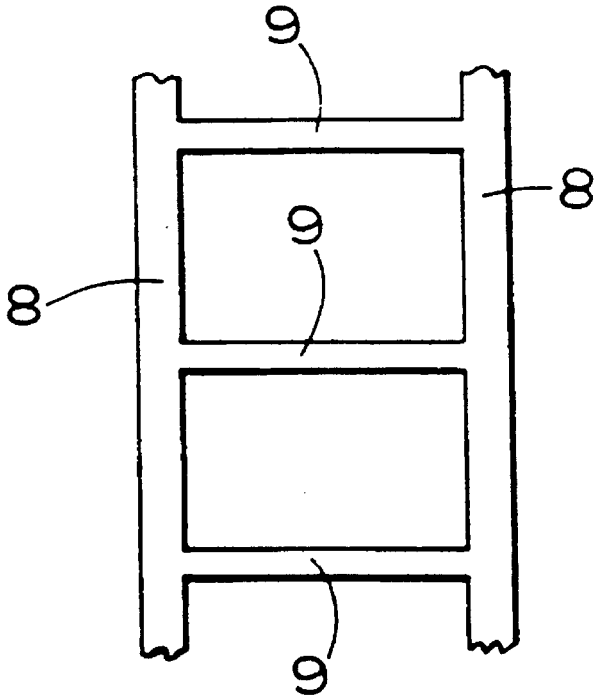
FIG. 5 is a front view of a support element according to the present invention for the reel-strip of FIGS. 2 to 4.
Figure 6:
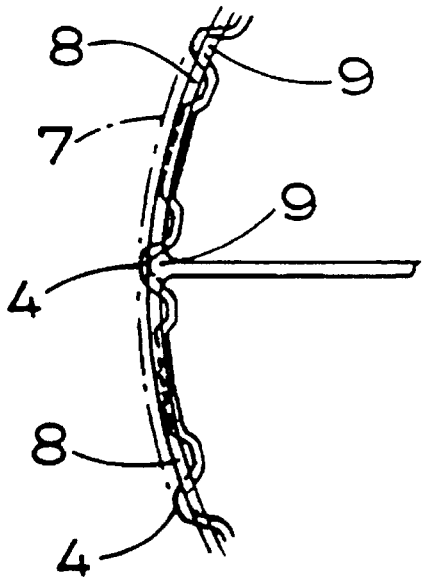
FIG. 6 is a sectional view showing a reel-strip mounted on the support element of FIG. 5.

The reel-strips of FIGS. 2 to 4 and 7 and 8 can be mounted readily on a support element of skeletal form having ring members 8 connected at regular intervals by transverse cross-members 9 (FIGS. 5 and 6). In this arrangement the sunken surrounding regions 6 which "frame" the symbols 5 can be positively located between the cross-members 9, thus locating accurately the position of the symbols on the support element. The support element need have only one ring provided with transverse support members, and/or could comprise a dished plate.

The reel-strip of FIGS. 2 to 4 and 7 and 8 can also be mounted by means of one, or two spaced, ring members provided at an edge of the strip, the ring members defining a channel in which the edge (or edges) of the strip is received. The edge of the strip may have a flange provided for location in such a channel; for example the strip 20 of FIGS. 8 and 8 could have a flange projecting outwards at right angles to the side walls 30.

FIG. 9a shows a reel support which comprises two side members or "spiders" for supporting the reel strip. Each spider has a central shaft 40 from which a plurality of spokes 41 radiate. A ring member 42 is attached to the ends of the spokes 41. The spiders are spaced apart on the shaft 40 a distance equal to the width of the reel strip 1 (shown by dotted lines), and the reel strip 1 is supported, along its edges, by the ring member 42.

If the reel strip is made of suitably stiff material, one of the spiders may be omitted, as shown in FIG. 9b. The ring member 42 supports one edge of the reel strip, the other edge being unsupported.

As a further development of the arrangements shown in FIGS. 9a and 9b, the ring member 42 may be omitted from the spiders. The spokes 41 then engage the reel strip 1 which is entirely self-supporting betweeen adjacent spokes 41. One or two spiders of this type may be used in a complete support.

The ring members 42 may have transverse support members extending across the width of the reel-strip 1, or such support members may be provided directly on the spokes 41.

If a reel-strip of the type shown in FIGS. 2 to 4 is used (or that of FIGS. 7 and 8), in conjunction with a spider of the types shown, the spokes 41 may advantageously engage the strip 1 at its raised sections 4. This arrangement is shown in FIG. 10.

When the reel-strip of FIGS. 7 and 8 is used, the side walls 30 may assist in locating the strip relative to the reel support.

The reel-strips may be provided with locating formations specifically adapted to co-operate with complementary formations provided in the reel support.

FIG. 11 shows a reel in accordance with the second aspect of the invention and comprises support means 60 for the reel strip having first and second vacuum-formed side members 61. Each side member 61 has the general form of a dished plate with radial reinforcing ribs 62 extending from a central annular hub plate 63.

The two side members 61 are disposed face-to-face, as if stacking dished plates. The hub plates 63 are secured to an output shaft 64 of a stepper motor 65. A circlip 66 retains the hub plates 63 to the shaft 64. The members 61 have a central flat portion 67 extending from the hub plate 63 to a frusto-conical portion 68, and a cylindrical portion 69 extending from the radially outermost part of the frusto-conical portion 68. The two circular edges of the cylindrical portion 69 are provided with oppositely facing channels in which the edges of the reel-strip 21 are retained. The rigidity of the reel-strip contributes to the strength of the reel, the reel-strip having a significant degree of structural strength.

FIG. 12 illustrates a section through a similar reel to that of FIG. 11, similar reference numerals being given to similar components.

The mounting of the reel on the drive shaft 64' is shown more clearly in FIG. 12. A drive peg 70 is received in a recess 71 of a hub formation 72 and keys the hub formation to the drive shaft 65', and the two side members 61' are held to the hub formation 72 by means of an L-section formation 73 towards their centres and a washer 74. The washer 74 is retained by snap-fit retaining lugs 75 provided on the hub formation 72.

The cross-section of the two side members 61' can be seen clearly in FIG. 12 which shows a first one of the side members, member 61'a, having a channel region 76 provided with two channels 77 and 78, and the second side member, member 61'b, having a returned, generally cylindrical, portion 79 and a channel region 80 provided with two channels 81 and 82. An illumination unit 83 is also shown.

The profiled strip 21 of FIGS. 7 and 8, but with outturned flanges 84, is located in channels 77 and 81 and thereby supported at its edges. A separate reel-strip 85 overlies strip 21, is retained in channels 78 and 82, and rests on the frame surfaces 25 of the strip 21. The strip 85 is generally transparent, but carries numbers, or other indicia or symbols, superimposed above selected symbols or fruit of the strip 21. This makes it possible to have all of the fruit of a particulr kind of the strip 21 identical, without moulding numbers over selected ones. A co-pending application filed at the same time as this application is directed towards this feature.

In a modification of the support means 60 and 60', instead of being dished plates with reinforcing ribs, the thin sheet material between the ribs 62, 62' could be omitted to leave a series of spider legs as the support means.

FIG. 13 shows a reel similar to that of FIG. 12, but with a frusto-conical portion 90, instead of generally cylindrical portion 79. The illumination unit, referenced as 91, comprises a parabolic reflector. The structure of FIG. 13 has been found to reduce the amount of material used, and to simplify the vacuum forming of the side members. The deeper draw of the form of FIG. 12 thins and weakens the material at point A and would necessitate the use of initially thicker plastics sheet, negating the potential material and inertial advantages of this type of reel formation to some extent. The form of FIG. 13 allows the use of thinner sheet material and would give fewer problems in the forming process as the stress at point A and material thinning is considerably less.

I claim:

1. A reel for a gaming or amusement machine comprising a support structure and a reel strip, said reel strip having an axis of rotation, said support structure extending from said axis of rotation and said support structure supporting said reel strip, wherein said support structure is provided with one or more support formations which engage said reel strip, said support formations being provided at the periphery of said support structure, and wherein said support formations are provided in a single radial plane only, said radial plane being normal to said axis of rotation, and said support formations contacting only a small proportion of the width of said reel strip, said reel strip being self-supporting over the remainder of said width of said reel strip.

2. A reel according to claim 1, wherein said support structure is an annulus such that said support formations are continuous in form.

3. A reel according to claim 1, wherein said support structure is spoked and said spoked support structure is provided with a peripheral ring, said support formations being provided on said peripheral ring.

4. A reel according to claim 1, wherein said support formations engage one edge of said reel strip, said reel strip being self-supporting away from said support formations.

5. A reel according to claim 1, wherein said support formations are in the form of a groove or channel, and said groove or channel receives one edge of said reel strip.

6. A gaming or amusement machine incorporating a reel, said reel comprising a support structure and a reel strip, said reel having an axis of rotation, said support structure extending from said axis of rotation and said support structure supporting said reel strip, wherein said support structure is provided with at least one support formation which engages said reel strip, said support formation being provided at the periphery of said support structure, and wherein said support formation is provided in a single radial plane only, said radial plane being normal to said axis of rotation, and said support formation contacting only a small proportion of the width of said reel strip, said reel strip being self-supporting over the remainder of said width of said reel strip.

* * * * *

UNITED STATES PATENT AND TRADEMARK OFFICE

CERTIFICATE OF CORRECTION

PATENT NO. : Re. 35,226
DATED : May 7, 1996
INVENTOR(S) : T. Howard

It is certified that error appears in the above-indentified patent and that said Letters Patent is hereby corrected as shown below:

| COLUMN | LINE | |
|---|---|---|
| 1 | 7 | After "[64]" and before "[30]" insert --[63] Related U.S. Application Data Continuation of International PCT Application No. PCT/GB90/01258 Filed, August 10, 1990-- |
| Item, [56] (pg. 1, col. 2) | Refs. Cited For. Pat .Docs | Insert --3-21278(A) 1/30/1991 Japan-- |
| 1 | | "beneift" should read --benefit-- |

Signed and Sealed this

Third Day of December, 1996

Bruce Lehman

*Attest:*

BRUCE LEHMAN

*Attesting Officer*

*Commissioner of Patents and Trademarks*